(12) United States Patent
Chang

(10) Patent No.: US 10,814,850 B2
(45) Date of Patent: Oct. 27, 2020

(54) HYDRAULIC BRAKE DEVICE WITH A TIME DIFFERENCE AND ASSEMBLY THEREOF

(71) Applicant: GINDA NEW-TECH CO., LTD., Kaohsiung (TW)

(72) Inventor: Jui-Lung Chang, Kaohsiung (TW)

(73) Assignee: GINDA NEW-TECH CO., LTD., Kaohsiung (TW)

( * ) Notice: Subject to any disclaimer, the term of this patent is extended or adjusted under 35 U.S.C. 154(b) by 58 days.

(21) Appl. No.: 16/094,459

(22) PCT Filed: May 4, 2016

(86) PCT No.: PCT/CN2016/080936
§ 371 (c)(1),
(2) Date: Oct. 17, 2018

(87) PCT Pub. No.: WO2017/190280
PCT Pub. Date: Nov. 9, 2017

(65) Prior Publication Data
US 2019/0118787 A1    Apr. 25, 2019

(51) Int. Cl.
*B60T 11/10* (2006.01)
*B60T 7/10* (2006.01)
(Continued)

(52) U.S. Cl.
CPC ............. *B60T 11/101* (2013.01); *B60T 7/102* (2013.01); *B60T 11/046* (2013.01);
(Continued)

(58) Field of Classification Search
CPC ...... B60T 11/101; B60T 7/102; B60T 11/224; F16D 2025/081; F16D 2025/082; F16D 2048/0212; B62L 3/08
See application file for complete search history.

(56) References Cited

U.S. PATENT DOCUMENTS 3,153,328 A * 10/1964 Seethaler ............ B60T 11/206
60/581
3,259,214 A * 7/1966 Lepelletier ............ F16D 53/00
188/346
(Continued)

FOREIGN PATENT DOCUMENTS

CN     1353068 A     6/2002
CN     1477015 A     2/2004
(Continued)

OTHER PUBLICATIONS

The International Search Report of corresponding International PCT Application No. PCT/CN2016/080936, dated Jan. 20, 2017.

*Primary Examiner* — Bradley T King
*Assistant Examiner* — James K Hsiao
(74) *Attorney, Agent, or Firm* — J.C. Patents

(57) ABSTRACT

This invention relates to a hydraulic brake device with a time difference, which utilizes an innovative brake structure to realize the time difference braking technique in which the rear wheel preferentially activates the braking action, to prevent the vehicles from slipping or spillover. Moreover, said time difference hydraulic brake device in the present invention can increase the braking force of the front wheel brake, this allows bicycles, motorcycles, electric scooters, automobiles and other vehicles to effectively improve braking performance and safety.

14 Claims, 4 Drawing Sheets

(51) Int. Cl.
  *B62L 3/08* (2006.01)
  *B60T 11/04* (2006.01)
  *B60T 11/224* (2006.01)
  *B62L 3/02* (2006.01)

(52) U.S. Cl.
  CPC ............ *B60T 11/224* (2013.01); *B62L 3/023* (2013.01); *B62L 3/08* (2013.01)

(56) References Cited

U.S. PATENT DOCUMENTS

| | | | | |
|---|---|---|---|---|
| 3,435,922 | A * | 4/1969 | Schmid | F16D 55/22 |
| | | | | 188/106 F |
| 3,437,179 | A * | 4/1969 | Lepelletier | B60T 11/24 |
| | | | | 188/346 |
| 3,760,587 | A * | 9/1973 | Ingram | B60T 13/146 |
| | | | | 60/575 |
| 4,326,379 | A * | 4/1982 | Dauvergne | B60T 13/143 |
| | | | | 60/550 |
| 4,443,040 | A * | 4/1984 | Farr | B60T 13/143 |
| | | | | 303/50 |
| 4,465,322 | A * | 8/1984 | Hayashi | B60T 8/261 |
| | | | | 303/115.6 |
| 4,505,116 | A * | 3/1985 | Weiler | B60T 11/203 |
| | | | | 60/547.1 |
| 4,559,781 | A * | 12/1985 | Steer | B60T 11/20 |
| | | | | 277/449 |
| 4,598,954 | A * | 7/1986 | Hayashi | B60T 8/261 |
| | | | | 188/106 P |
| 4,621,498 | A * | 11/1986 | Schaefer | B60T 11/224 |
| | | | | 60/562 |
| 4,631,924 | A * | 12/1986 | Lowe | B60T 11/203 |
| | | | | 60/562 |
| 4,698,971 | A * | 10/1987 | Sansone | B60T 11/101 |
| | | | | 60/581 |
| 4,794,757 | A * | 1/1989 | Schluter | B60T 11/20 |
| | | | | 60/562 |
| 4,843,819 | A * | 7/1989 | Leiber | B60T 8/441 |
| | | | | 60/550 |
| 5,337,564 | A * | 8/1994 | Bakke | B60T 11/224 |
| | | | | 60/402 |
| 6,070,949 | A | 6/2000 | Hariu et al. | 303/9.61 |
| 6,082,831 | A * | 7/2000 | Hageman | B60T 8/326 |
| | | | | 303/115.2 |
| 6,390,566 | B1 * | 5/2002 | Matsuno | B60T 8/26 |
| | | | | 188/345 |
| 6,606,859 | B1 * | 8/2003 | Mackiewicz | B60T 8/4836 |
| | | | | 60/547.1 |
| 2002/0007635 | A1 * | 1/2002 | Becker | B60T 11/224 |
| | | | | 60/578 |
| 2002/0053206 | A1 * | 5/2002 | Oka | B60T 8/00 |
| | | | | 60/548 |
| 2002/0059796 | A1 * | 5/2002 | Dieringer | B60T 8/4275 |
| | | | | 60/565 |
| 2003/0213241 | A1 * | 11/2003 | Ogiwara | B60T 11/224 |
| | | | | 60/592 |
| 2004/0050025 | A1 * | 3/2004 | Vandendriessche | A01D 69/10 |
| | | | | 56/10.2 R |
| 2005/0138927 | A1 * | 6/2005 | Arrigoni | B60T 11/224 |
| | | | | 60/533 |
| 2009/0033144 | A1 * | 2/2009 | Ikeda | B60T 8/3225 |
| | | | | 303/20 |
| 2009/0057092 | A1 * | 3/2009 | Hayakawa | F16D 29/005 |
| | | | | 192/85.5 |
| 2010/0117446 | A1 * | 5/2010 | Siegrist | B60T 11/224 |
| | | | | 303/14 |
| 2010/0164276 | A1 * | 7/2010 | Schluter | B60T 7/042 |
| | | | | 303/15 |
| 2011/0297493 | A1 * | 12/2011 | Vollert | B60T 7/042 |
| | | | | 188/106 R |
| 2015/0197228 | A1 * | 7/2015 | Isono | B60T 11/224 |
| | | | | 92/61 |
| 2015/0251643 | A1 * | 9/2015 | Isono | B60T 7/042 |
| | | | | 60/588 |
| 2015/0285273 | A1 * | 10/2015 | Isono | B60T 11/18 |
| | | | | 60/533 |
| 2015/0291139 | A1 * | 10/2015 | Isono | B60T 7/042 |
| | | | | 60/533 |
| 2015/0321651 | A1 * | 11/2015 | Lhuillier | B60T 11/203 |
| | | | | 60/533 |
| 2016/0031426 | A1 * | 2/2016 | Feigel | B60T 8/4018 |
| | | | | 303/115.2 |
| 2016/0046272 | A1 * | 2/2016 | Masur | B60T 13/662 |
| | | | | 303/15 |
| 2016/0159330 | A1 * | 6/2016 | Anderson | B60T 7/042 |
| | | | | 60/533 |
| 2016/0288864 | A1 * | 10/2016 | Kajihara | B62K 23/06 |
| 2016/0332611 | A1 * | 11/2016 | Bussmann | B60T 15/028 |
| 2017/0113669 | A1 * | 4/2017 | Nakazawa | B60T 11/224 |
| 2019/0263471 | A1 * | 8/2019 | Chang | B60T 11/20 |

FOREIGN PATENT DOCUMENTS

| | | |
|---|---|---|
| CN | 2863626 Y | 1/2007 |
| CN | 101108644 A | 1/2008 |
| CN | 201472594 U | 5/2010 |
| JP | 2014-144739 A | 8/2014 |
| TW | 201429791 A | 8/2014 |

* cited by examiner

HYDRAULIC BRAKE DEVICE WITH A TIME DIFFERENCE AND ASSEMBLY THEREOF

CROSS-REFERENCE TO RELATED APPLICATION

This application is a national phase application of international application No. PCT/CN2016/080936 filed on May 04, 2016. The content of this prior application is hereby incorporated by reference in its entirety.

BACKGROUND OF THE INVENTION

1. Field of the Invention

This invention relates to a brake device field, particularly to a time difference hydraulic brake device for vehicles.

2. Description of the Prior Art

At present, the brake systems of various vehicles, such as the front and rear wheel brakes of automobiles, are used a pump to simultaneously drive the oil pressure tubes of the front and rear wheel brakes to generate braking force. When the car engine is in the forward position, the distance between the rear wheel and the pump will be greater than the distance between the front wheel and the pump. Thus, when the driver starts the brakes, the rear wheel brakes will be slower than the front wheel brakes. In this situation, if the automobile is using the rear wheel transmission structure, when the driver drives the brake, the front wheel will generate braking force and the rear wheel will continue to output power, which will cause the automobile to slip.

In addition, with regard to a rideable vehicle, such as a motorcycle or a bicycle, etc., the brake operating components of the front and rear wheels of the rideable vehicle are respectively provided on both sides of the handle, and the braking action of the front and rear wheel is controlled by the rider. When the rider drives the front wheel brake first, the rear wheel will continue to output power, so that an excessive speed difference between the front and rear wheels will be generated, this will easily lead to the accident of the rider spillover, resulting in irreparable results.

SUMMARY OF THE INVENTION

If the vehicles has the function of adjusting the time difference between the front wheel brakes and rear wheel brakes, the rear wheel brakes can be driven first when the brake is started, and then the front wheel brake will be driven later, so that the brake problem of the foregoing vehicles can be solved, and the safety of brakes in various vehicles can be improved.

For this reason, the inventor of this invention, having much experience in designing and manufacturing brake device and its related products, understands and researches the brake problems of various vehicles and hence devised this invention.

The objective of this invention is to offer a hydraulic brake device with a time difference, which can make the rear wheel brake and the front wheel brake device generate a time difference braking action, and can increase the braking force of the front wheel brake, this allows bicycles, motorcycles, electric scooters, automobiles and other vehicles to effectively improve braking performance and safety.

The hydraulic brake device with a time difference in the present invention includes at least a driving device, a housing, a first pump mechanism and a second pump mechanism as main components combined together. Said driving device is provided with a pushing block, and the pushing block is located in the cavity room of the housing. Said first pump mechanism is mounted in the casing, the first pump mechanism is provided with a first piston and a first chamber below the push block, the first piston is arranged in the first chamber, an interval space is formed between the first chamber and the push block, the upper end of said first piston is extended out of the first chamber, and the upper end of said first piston is pressed against the lower end of the push block; said first chamber is internally filled with hydraulic fluid, a first elastic member is disposed in the first chamber, the first elastic member is located between the lower end of the first piston and the lower wall surface of the first chamber; the lower wall surface of said first chamber is provided with a first output duct, the first output pipe can output the hydraulic fluid inside the first chamber to the rear wheel brake, and to drive the rear wheel brake to generate a braking force. Said second pump mechanism is mounted in the casing, the second pump mechanism is provided with a second piston and a second chamber below the push block, the second piston is arranged in the second chamber, an interval space is formed between the second chamber and the push block, the upper end of said second piston is extended out of the second chamber, and the upper end of the second piston and the lower end of the push block have a separation distance; said second chamber is internally filled with hydraulic fluid, a second elastic member is disposed in the second chamber, the second elastic member is located between the lower end of the second piston and the lower wall surface of the second chamber; the lower wall surface of said second chamber is provided with a second output duct, the second output pipe can output the hydraulic fluid inside the second chamber to the front wheel brake, and to drive the front wheel brake to generate a braking force.

The hydraulic brake device with a time difference in the present invention, which may be consisted of at least two sets of interconnected time difference hydraulic brake devices, wherein the first output ducts of the first pump mechanisms of each set of time difference hydraulic brake device is connected together by a connection valve, the hydraulic fluid in each of the first chamber can be output to the rear wheel brake at the same time or separately; the second output ducts of the second pump mechanisms of each set of time difference hydraulic brake device is connected together by a connection valve, the hydraulic fluid in each of the second chamber can be output to the front wheel brake at the same time or separately.

The hydraulic brake device with a time difference in the present invention, among which said first piston of the first pump mechanism and the second piston of the second pump mechanism may be provided in different sizes to provide different braking forces. When the size of said second piston is larger than the size of the first piston, the braking force of the front wheel brake is larger than the braking force of the rear wheel brake.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
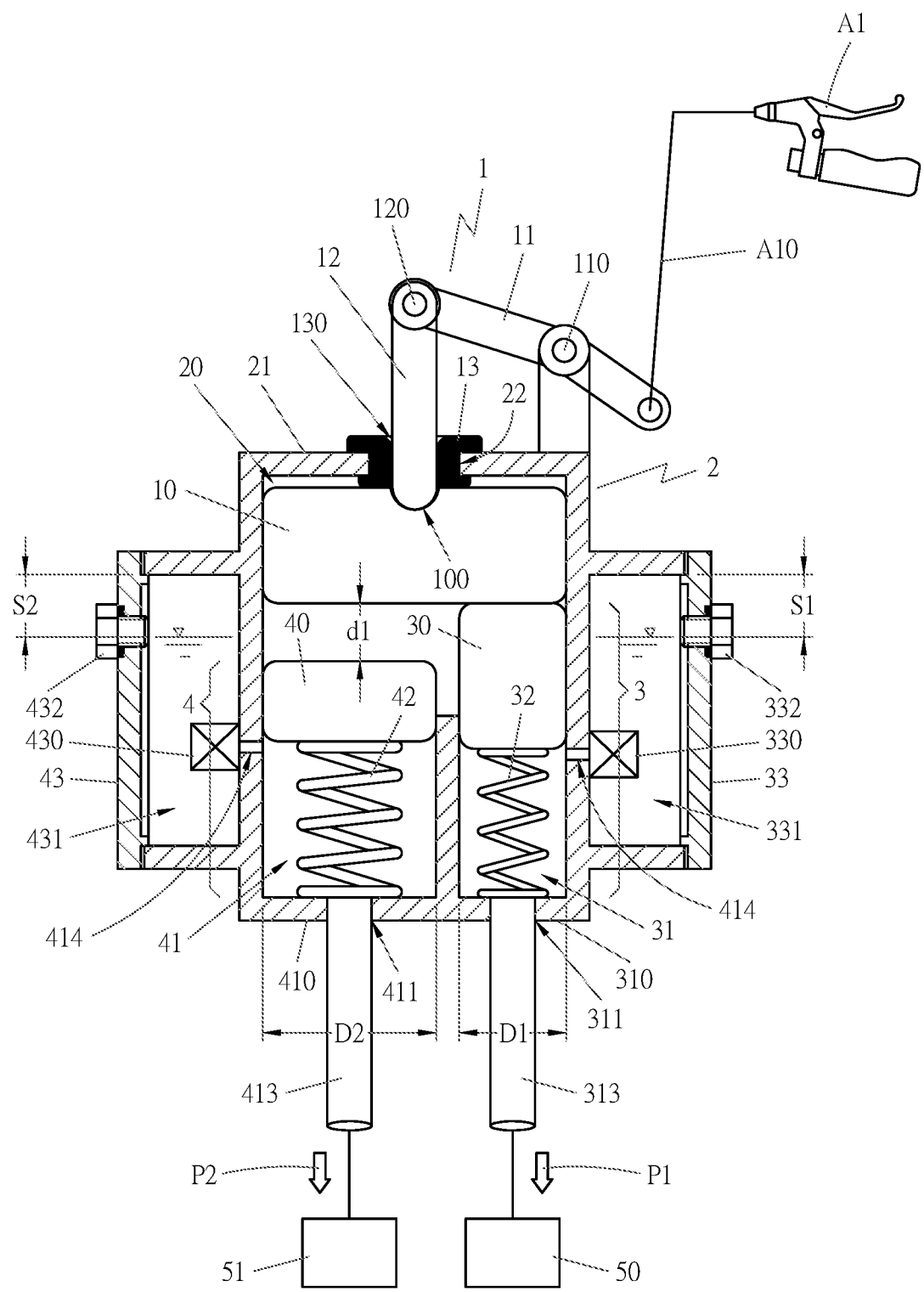
FIG. 1 is a partial sectional view in the present invention.
Figure 2:
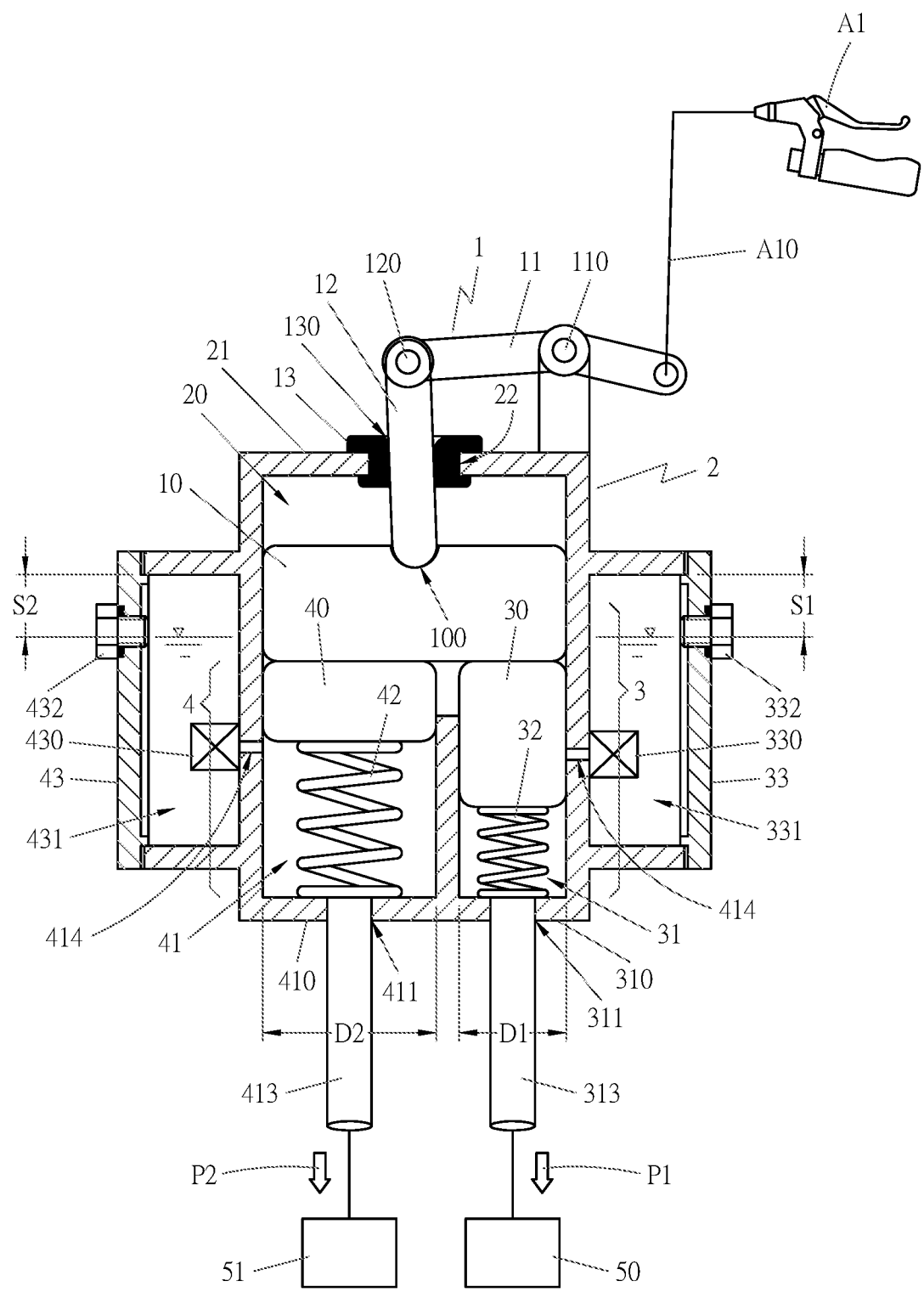
FIG. 2 is a schematic view of the operating state in the present invention, and show the action of the first piston being pressed.
Figure 3:
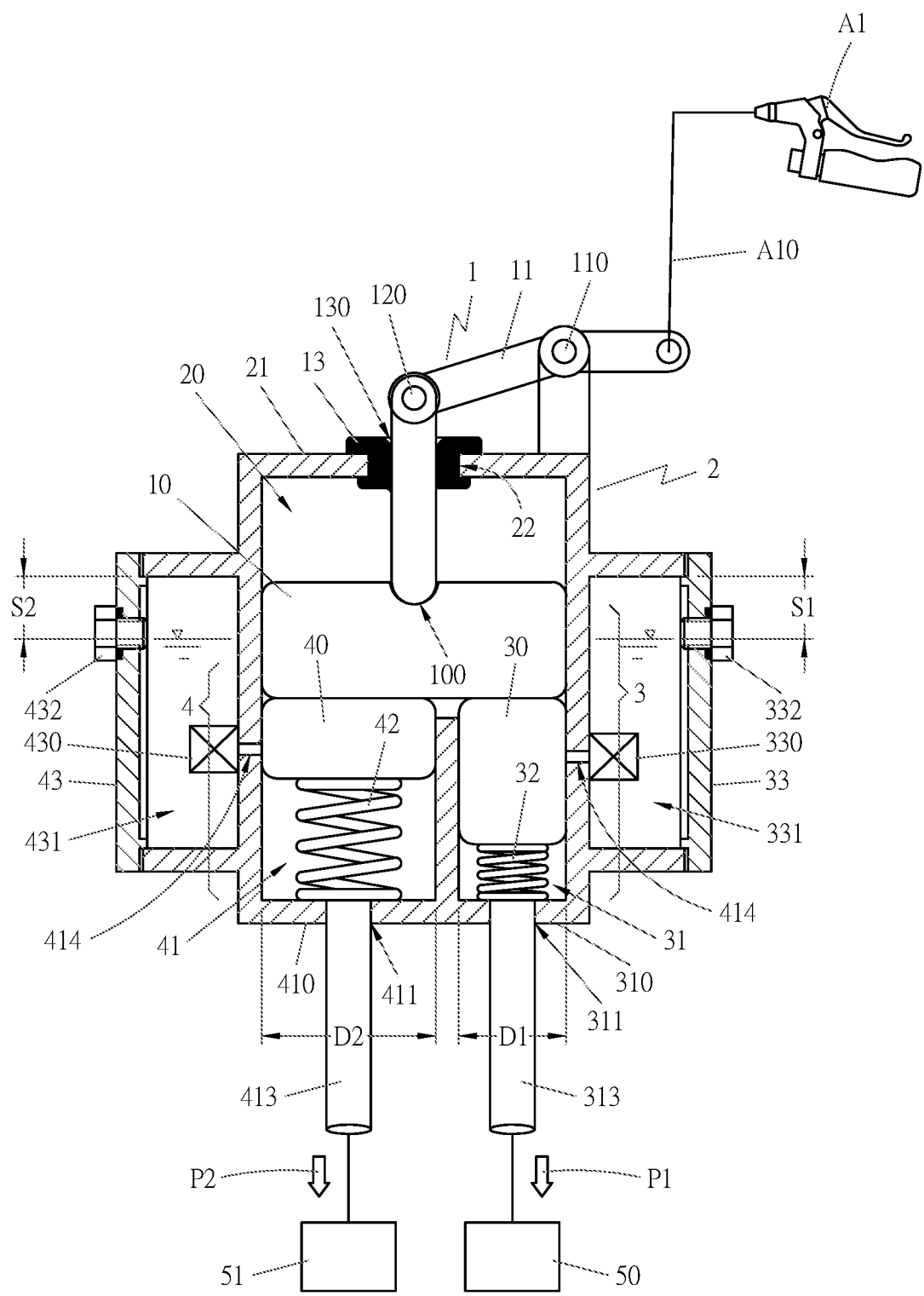
FIG. 3 is a schematic view of the operating state in the present invention, and show the action of the first piston and the second piston being simultaneously pressed.

A preferred embodiment of the hydraulic brake device with a time difference in the present invention, as shown in FIGS. 1 to 3 includes at least a driving device 1, a housing 2, a first pump mechanism 3 and a second pump mechanism 4 as main components combined together.

Said driving device 1 is connected to the brake operating element A1 of the vehicle, the driving device 1 is provided with a pushing block 10, and the pushing block 10 is located in the cavity room 20 of the housing 2, a coupling groove 100 is provided at an upper center position of said pushing block 10, and a driving rod 12 is mounted on the coupling groove 100. Said driving device 1 is provided with a lever 11 above said housing 2, a fulcrum 110 is arranged on the lever 11, one end of said lever 11 is connected with the cable wire A10 of the brake operating assembly A1, and the other end is coupled with said driving rod 12, an active fulcrum 120 is arranged between the lever 11 and the driving rod 12. In this way, when the brake operating element A1 is activated, the lever 11 can be used to drive the driving rod 12 to generate a downward pushing pressure, and push the pushing block 10 to generate a downward displacement. The distance at which the pushing block 10 is displaced is determined by the brake operating element A1, that is, the greater the force output by the brake operating element A1, the longer the distance move by the pushing block 10 (As shown in FIG. 2 and FIG. 3).

As shown in FIGS. 1 to 3, the driving device 1 is provided with a rod holder 13 and a through hole 130 is formed on the rod holder 13. Said driving rod 12 is mounted in the through hole 130 of the rod holder 13, the rod holder 13 can be made of a flexible material such as rubber or silicone, so that an optimum sealing effect can be achieved between the driving rod 12 and the casing 2.

Said housing 2 is provided with a cavity room 20, a rod hole 22 is formed on the upper wall surface 21 of the housing 2, and said rod holder 13 is mounted in the rod hole 22.

As shown in FIGS. 1 to 3, said first pump mechanism 3 is mounted in the casing 2, the first pump mechanism 3 is provided with a first piston 30 and a first chamber 31 below the push block 10, and the first piston 30 is arranged in the first chamber 31. An interval space is formed between the first chamber 31 and the push block 10, the upper end of said first piston 30 is extended out of the first chamber 31, and the upper end of said first piston 30 is pressed against the lower end of the push block 10. Said first chamber 31 is internally filled with hydraulic fluid, and the first piston 30 is provided with a sealing member, such as an oil seal or an O-ring (not shown in Figures). A first elastic member 32, such as a compression spring, is disposed in the first chamber 31, and the first elastic member 32 is located between the lower end of the first piston 30 and the lower wall surface 310 of the first chamber 31. The lower wall surface 310 of said first chamber 31 is formed a first hole 311, and the first hole 311 is provided with a first output duct 313, so that the first output pipe 313 can output the hydraulic fluid inside the first chamber 31 to the rear wheel brake 50, and to drive the rear wheel brake 50 to generate a braking force.

As shown in FIGS. 1 to 3, said first chamber 31 is provided with a first replenishing device 33, the first replenishing device 33 can be disposed on the outer side of the casing 2, and the first replenishing device 33 can be made of plastic or other light-transmissive material, so that the user can observe the amount of hydraulic fluid of the first replenishing device 33. Said first replenishing device 33 is provided with a first regulating valve 330, and a first connecting duct 314 is formed between the first chamber 31 and the first replenishing device 33, said first regulating valve 330 can adjust or supplement the hydraulic fluid in the first chamber 31. The first replenishing device 33 is provided with a first fluid storage tank 331. The first fluid storage tank 331 is provided with a first plug 332, and the hydraulic fluid in the first fluid storage tank 331 can be replenished or replaced through the first plug 332. A gas temporary storage space 51 is disposed in the first fluid storage tank 331, and said first connection duct 314 is formed at a highest water level of the hydraulic fluid of the first chamber 31. In this way, the air bubbles generated from the first chamber 31 can be transported to the gas temporary storage space S1 of the first fluid storage tank 330 through the first output duct 313 and the first regulating valve 330 to maintain the quality and temperature of the hydraulic fluid in the first chamber 31.

As shown in FIGS. 1 to 3, said second pump mechanism 4 is mounted in the casing 2, the second pump mechanism 4 is provided with a second piston 40 and a second chamber 41 below the push block 10, and the second piston 40 is arranged in the second chamber 41. An interval space is formed between the second chamber 41 and the push block 10, the upper end of said second piston 40 is extended out of the second chamber 41, and the upper end of the second piston 40 and the lower end of the push block 10 have a separation distance d1. Said second chamber 41 is internally filled with hydraulic fluid, and the second piston 40 is provided with a sealing member, such as an oil seal or an O-ring (not shown in Figures). A second elastic member 42, such as a compression spring, is disposed in the second chamber 41, and the second elastic member 42 is located between the lower end of the second piston 40 and the lower wall surface 410 of the second chamber 41. The lower wall surface 410 of said second chamber 41 is formed a second hole 411, and the second hole 411 is provided with a second output duct 413, so that the second output pipe 413 can output the hydraulic fluid inside the second chamber 41 to the front wheel brake 51, and to drive the front wheel brake 51 to generate a braking force.

As shown in FIGS. 1 to 3, said second chamber 41 is provided with a second replenishing device 43, the second replenishing device 43 can be disposed on the outer side of the casing 2, and the second replenishing device 43 can be made of plastic or other light-transmissive material, so that the user can observe the amount of hydraulic fluid of the second replenishing device 43. Said second replenishing device 43 is provided with a second regulating valve 430, and a second connecting duct 414 is formed between the second chamber 41 and the second replenishing device 43, said second regulating valve 430 can adjust or supplement the hydraulic fluid in the second chamber 41. The second replenishing device 43 is provided with a second fluid storage tank 431. The second fluid storage tank 431 is provided with a second plug 432, and the hydraulic fluid in the second fluid storage tank 431 can be replenished or replaced through the second plug 432. A gas temporary storage space S2 is disposed in the second fluid storage tank 431, and said second connection duct 414 is formed at a highest water level of the hydraulic fluid of the second chamber 41. In this way, the air bubbles generated from the second chamber 41 can be transported to the gas temporary storage space S2 of the second fluid storage tank 430 through the second output duct 413 and the second regulating valve 430 to maintain the quality and temperature of the hydraulic fluid in the second chamber 41.

The first piston 30 of the first pump mechanism 3 and the second piston 40 of the second pump mechanism 4 may be provided in different sizes to provide different braking forces. As shown in FIGS. 1 to 3, since the time for starting the front wheel brake 51 is later than the time for starting the rear wheel brake 50, in order to make the braking force of the front wheel brake 51 larger than the braking force of the rear wheel brake 50, the size D2 of said second piston 40 must be larger than the size D1 of the first piston 30, so that, when the pushing block 10 is pressed to the second piston 40, the second piston 40 can output more hydraulic fluid than the first piston 30, and the hydraulic brake force P2 of the second pump mechanism 4 can be greater than the hydraulic brake force P1 of the first pump mechanism 3

It is worth mentioning that said first replenishing device 33 of the first pump mechanism 3 and said second replenishing device 43 of the second pump mechanism 4 may be the same replenishing device, and the hydraulic fluid of the first chamber 31 of the first pump mechanism 3 and the hydraulic fluid of the second chamber 41 of the second pump mechanism 4 are simultaneously supplied by only one replenishing device.

In addition, said first pump mechanism 3 may not be provided with the first replenishing device 33, and said second pump mechanism 4 may not be provided with the second replenishing device 43, as long as sufficient hydraulic fluid is stored in the first chamber 31 and the second chamber 41, the same effect can be obtained.

As shown in FIG. 1, When the driver activates the brake operating element A1, the driving device 1 will drive the pushing block 10 to press the first piston 30 to move downward. At this time, the first elastic member 32 is compressed, and the first chamber 31 outputs the hydraulic brake force P1 downward to make the rear wheel brake 50 generate the braking force. As shown in FIG. 2, after the pushing block 10 moves a separation distance d1, the second piston 40 will be synchronously pressed to move downward together. At this time, the second elastic member 42 is compressed, and the second chamber 41 outputs the hydraulic brake force P2 downward to make the front wheel brake 51 generates the braking force. In this way, a time difference between rear wheel brake 50 and front wheel brake 51 can be achieved by performing one braking action, and through the special size design of the first piston 30 and the second piston 40, the second piston 40 started later can instantaneously output a hydraulic brake force greater than the first piston 30, to let the front wheel braked later have a larger braking force than the rear wheel.

Figure 4:
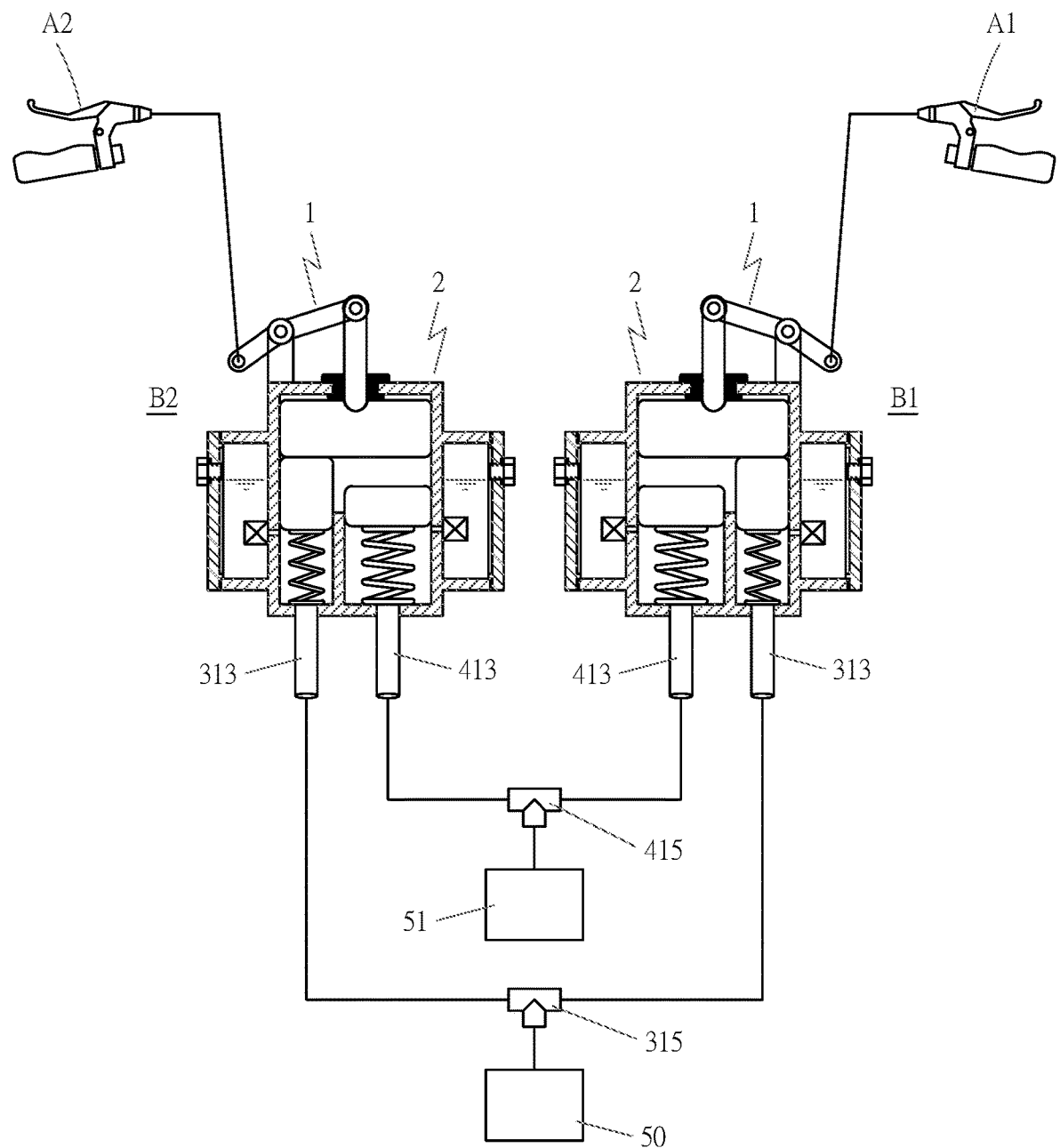
FIG. 4 is a schematic view of the two sets of time difference hydraulic brake devices connected together in the present invention.

The present invention can provide at least one set of time difference hydraulic brake device on the vehicle according to requirements. As shown in FIG. 4, the present invention can be provided with two sets of time difference hydraulic brake devices B1, B2, which are respectively connected with two brake operating elements A1, A2. The first output ducts 313 of the first pump mechanisms 3 of the two time difference hydraulic brake devices B1, B2 are connected together by a connection valve 315, the hydraulic fluid in each of the first chamber 31 can be output to the rear wheel brake 50 at the same time or separately; the second output ducts 413 of the second pump mechanisms 4 of the two time difference hydraulic brake devices B1, B2 are connected together by a connection valve 415, the hydraulic fluid in each of the second chamber 41 can be output to the front wheel brake 51 at the same time or separately. In this way, with a plurality of time difference hydraulic brake devices, even if one time difference hydraulic brake device suddenly breaks down, the brake function of the vehicle will not be invalid, so as to improve driving safety.

In summary, the present invention utilizes an innovative brake structure to realize the time difference braking technique in which the rear wheel preferentially activates the braking action, to prevent the vehicles from slipping or spillover. Evidently this invention has tangible benefits and tallies with progressiveness and novelty demanded by patent laws.

While the preferred embodiments of this invention have been described above, it will be recognized and understood that various modifications may be made therein and appended claims are intended to cover all such modifications that may fall within the spirit and scope of the invention.

What is claimed is:

1. A hydraulic brake device with a time difference least comprising:
   a housing with a cavity room;
   a driving device is provided with a pushing block, wherein the pushing block is located in the cavity room of the housing, said driving device can drive the pushing block to move within the cavity room of the housing;
   a first pump mechanism mounted in the housing, wherein the first pump mechanism is provided with a first piston and a first chamber below the pushing block, the first piston is arranged in the first chamber, an interval space is formed between the first chamber and the pushing block, an upper end of said first piston is extended out of the first chamber, and the upper end of said first piston is pressed against a lower end of the pushing block; when in use, said pushing block can drive the first piston to output a first braking force to a rear wheel brake;
   a second pump mechanism mounted in the housing, wherein the second pump mechanism is provided with a second piston and a second chamber below the pushing block, the second piston is arranged in the second chamber, an interval space is formed between the second chamber and the pushing block, an upper end of said second piston is extended out of the second chamber, and the upper end of the second piston and the lower end of the pushing block have an initial separation distance; said pushing block can drive the second piston to output a second braking force to a front wheel brake;
   wherein a cross sectional dimension of the second piston is larger than a cross sectional dimension of the first piston, so that the second braking force output by the second pump mechanism is greater than the first braking force output by the first pump mechanism;
   wherein the first chamber is not in communication with the second chamber, and the first chamber and the second chamber partially share a sidewall with the housing, respectively.

2. The hydraulic brake device with a time difference according to claim 1, wherein a coupling groove is provided at an upper center position of said pushing block, and a driving rod is mounted on the coupling groove; said driving device is provided with a lever above said housing, one end of said lever is connected with a brake operating assembly, the other end of said lever is coupled with said driving rod, an active fulcrum is arranged between the lever and the driving rod; when a brake operating element is activated, the lever drives the driving rod to generate a downward pushing pressure and push the pushing block to generate a downward displacement.

3. The hydraulic brake device with a time difference according to claim 1, wherein said driving device is provided with a rod holder, a through hole is formed on the rod holder, said driving rod is mounted in the through hole of the rod holder; a rod hole is formed on an upper wall surface of the housing, and said rod holder is mounted in the rod hole; the rod holder is made of a flexible material, so that an optimum sealing effect can be achieved between the driving rod and the housing.

4. The hydraulic brake device with a time difference according to claim 2, wherein said first chamber is internally filled with hydraulic fluid, a first elastic member is disposed in the first chamber, the first elastic member is located between a lower end of the first piston and a lower wall surface of the first chamber; the lower wall surface of said first chamber is provided with a first output duct, the first output pipe duct can output the hydraulic fluid inside the first chamber to the rear wheel brake, and to drive the rear wheel brake to generate a braking force.

5. The hydraulic brake device with a time difference according to claim 4, wherein said first chamber is provided with a first replenishing device, the first replenishing device is provided with a first regulating valve, and a first connecting duct is formed between the first chamber and the first replenishing device, said first regulating valve can adjust or supplement the hydraulic fluid in the first chamber; the first replenishing device is provided with a first fluid storage tank, the first fluid storage tank is provided with a first plug, and the hydraulic fluid in the first fluid storage tank can be replenished or replaced through the first plug; a gas temporary storage space is disposed in the first fluid storage tank, so that the air bubbles generated from the first chamber can be transported to the gas temporary storage space of the first fluid storage tank through the first output duct and the first regulating valve to maintain the quality and temperature of the hydraulic fluid in the first chamber.

6. The hydraulic brake device with a time difference according to claim 1, wherein said second chamber is internally filled with hydraulic fluid, a second elastic member is disposed in the second chamber, the second elastic member is located between a lower end of the second piston and a lower wall surface of the second chamber; the lower wall surface of said second chamber is provided with a second output duct, the second output duct can output the hydraulic fluid inside the second chamber to the front wheel brake, and to drive the front wheel brake to generate a braking force.

7. The hydraulic brake device with a time difference according to claim 2, wherein said second chamber is provided with a second replenishing device, the second replenishing device is provided with a second regulating valve, and a second connecting duct is formed between the second chamber and the second replenishing device, said second regulating valve can adjust or supplement the hydraulic fluid in the second chamber; the second replenishing device is provided with a second fluid storage tank, the second fluid storage tank is provided with a second plug, and the hydraulic fluid in the second fluid storage tank can be replenished or replaced through the second plug; a gas temporary storage space is disposed in the second fluid storage tank, so that air bubbles generated from the second chamber can be transported to the gas temporary storage space of the second fluid storage tank through the second output duct and the second regulating valve to maintain the quality and temperature of the hydraulic fluid in the second chamber.

8. A hydraulic brake device with a time difference comprising:
   a driving device provided with a pushing block;
   a first pump mechanism is- provided with a first piston and a first chamber below the pushing block, wherein the first piston is arranged in the first chamber, an interval space is formed between the first chamber and the pushing block, an upper end of said first piston is extended out of the first chamber, and the upper end of said first piston is pressed against a lower end of the pushing block; said pushing block can drive the first piston to output a first braking force to a rear wheel brake; said first chamber is provided with a first replenishing device, the first replenishing device is provided with a first regulating valve, said first regulating valve can adjust or supplement hydraulic fluid in the first chamber; the first replenishing device is provided with a first fluid storage tank; a gas temporary storage space is disposed in the first fluid storage tank to maintain the quality and temperature of the hydraulic fluid in the first chamber;
   a second pump mechanism is provided with a second piston and a second chamber below the pushing block, wherein the second piston is arranged in the second chamber, an interval space is formed between the second chamber and the pushing block, an upper end of said second piston is extended out of the second chamber, and the upper end of the second piston and a lower end of the pushing block have a separation distance; said pushing block can drive the second piston to output a second braking force to a front wheel brake; said second piston is provided with a second replenishing device, the second replenishing device is provided with a second regulating valve, said second regulating valve can adjust or supplement hydraulic fluid in the second chamber; the second replenishing device is provided with a second fluid storage tank; a gas temporary storage space is disposed in the second fluid storage tank to maintain the quality and temperature of the hydraulic fluid in the second chamber;
   wherein a cross sectional dimension of the second piston is larger than a cross sectional dimension of the first piston, so that the second braking force output by the second pump mechanism is greater than the first braking force output by the first pump mechanism;
   wherein the first chamber is not in communication with the second chamber, and the first chamber and the second chamber partially share a sidewall with the housing, respectively.

9. The hydraulic brake device with a time difference according to claim 8, wherein a coupling groove is provided at an upper center position of said pushing block, and a driving rod is mounted on the coupling groove; said driving device is provided with a lever, one end of said lever is connected with a brake operating assembly, the other end of said lever is coupled with said driving rod, an active fulcrum is arranged between the lever and the driving rod; when a brake operating element is activated, the lever drives the driving rod to generate a downward pushing pressure and push the pushing block to generate a downward displacement.

10. The hydraulic brake device with a time difference according to claim 9, wherein said driving device is provided with a rod holder, a through hole is formed on the rod holder, said driving rod is mounted in the through hole of the rod holder; said driving device is provided with a rod hole, said rod holder is mounted in the rod hole, the rod holder is made of a flexible material.

11. The hydraulic brake device with a time difference according to claim 8, wherein said first chamber is internally filled with hydraulic fluid, a first elastic member is disposed in the first chamber, the first elastic member is located between a lower end of the first piston and a lower wall surface of the first chamber; the lower wall surface of said first chamber is provided with a first output duct, the first output duct can output the hydraulic fluid inside the first chamber to the rear wheel brake, and to drive the rear wheel brake to generate a braking force.

12. The hydraulic brake device with a time difference according to claim 8, wherein said second chamber is internally filled with hydraulic fluid, a second elastic member is disposed in the second chamber, the second elastic member is located between the a lower end of the second piston and a lower wall surface of the second chamber; the lower wall surface of said second chamber is provided with a second output duct, the second output duct can output the hydraulic fluid inside the second chamber to the front wheel brake, and to drive the front wheel brake to generate a braking force.

13. The hydraulic brake device with a time difference according to claim 8, wherein said first replenishing device of the first pump mechanism and said second replenishing device of the second pump mechanism are the same replenishing device, and hydraulic fluid of the first chamber of the first pump mechanism and hydraulic fluid of the second chamber of the second pump mechanism are simultaneously supplied by only one replenishing device.

14. A hydraulic brake assembly with a time difference, comprising at least two sets of interconnected time difference hydraulic brake devices, each time difference hydraulic brake device is connected to a corresponding brake operating element, and each time difference hydraulic brake device at least comprising:
   a driving device is provided with a pushing block;
   a first pump mechanism is provided with a first piston below the pushing block, wherein an upper end of said first piston is pressed against a lower end of the pushing block, said pushing block can drive the first piston to output a first braking force to a rear wheel brake;
   a second pump mechanism is provided with a second piston below the pushing block, wherein an upper end of the second piston and a lower end of the pushing block have a separation distance, said pushing block can drive the second piston to output a second braking force to a front wheel brake;
   wherein a cross sectional dimension of the second piston is larger than a cross sectional dimension of the first piston, so that the second braking force output by the second pump mechanism is greater than the first braking force output by the first pump mechanism;
   wherein the first chamber is independent from the second chamber;
   wherein the first output ducts of the first pump mechanisms of the time difference hydraulic brake devices are is connected together by a connection valve, hydraulic fluid in each of the first chamber can be output to the rear wheel brake at the same time or separately; the second output ducts of the second pump mechanisms of the time difference hydraulic brake devices are is connected together by a connection valve, hydraulic fluid in each of the second chamber can be output to the front wheel brake at the same time or separately.

\* \* \* \* \*